Sept. 8, 1931.  O. M. SUMMERS  1,822,067
REFRIGERATING APPARATUS
Filed March 30, 1928  2 Sheets-Sheet 2
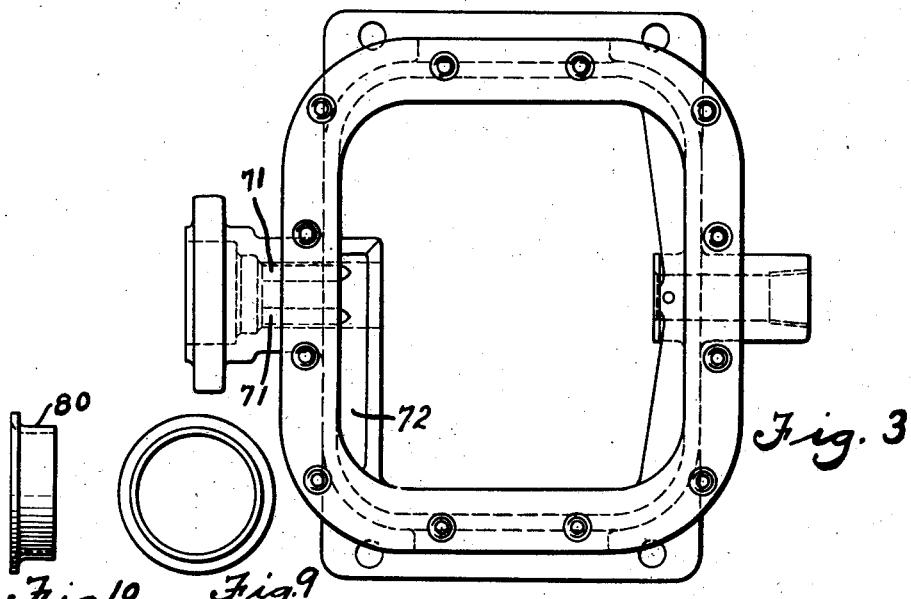
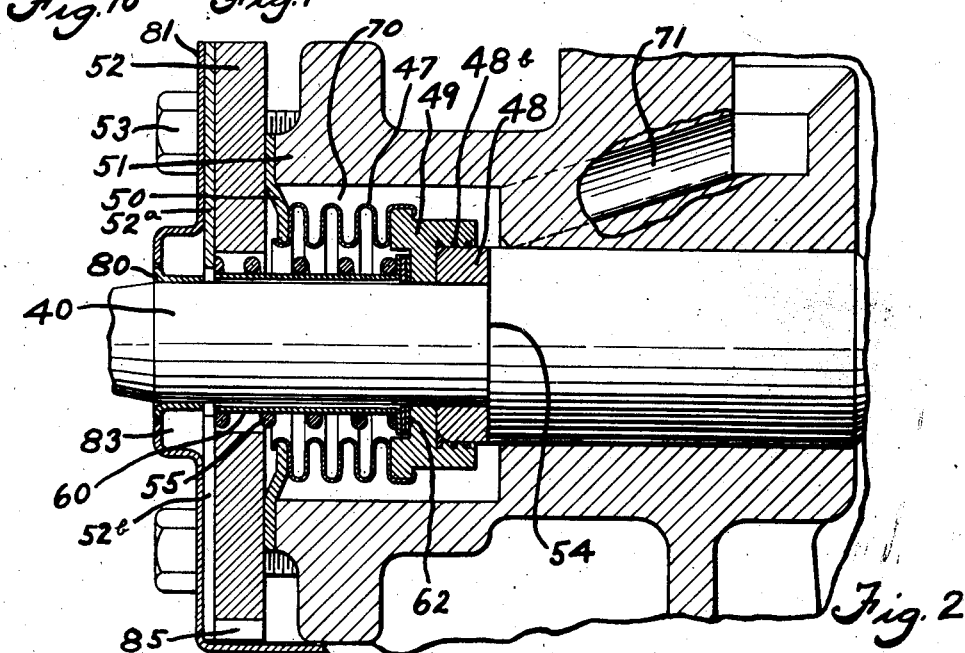
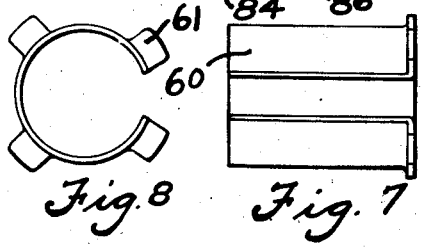

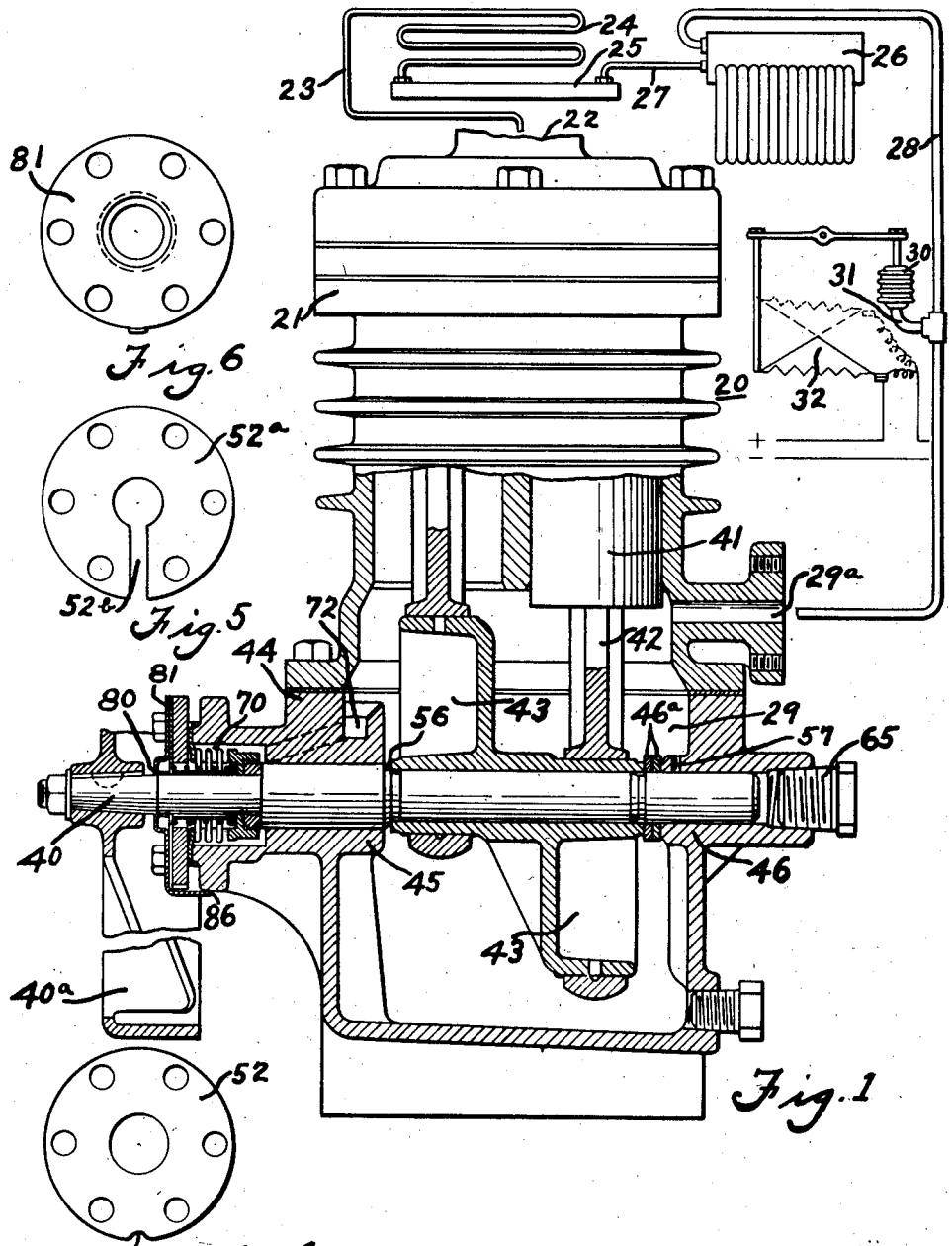

Patented Sept. 8, 1931

1,822,067

UNITED STATES PATENT OFFICE

OTTO M. SUMMERS, OF DAYTON, OHIO, ASSIGNOR TO FRIGIDAIRE CORPORATION, OF DAYTON, OHIO, A CORPORATION OF DELAWARE

REFRIGERATING APPARATUS

Application filed March 30, 1928. Serial No. 266,077.

This invention relates to refrigerating apparatus and more particularly to means for sealing a shaft passing through a casing of said apparatus.

An object of this invention is to provide a refrigerating apparatus wherein a shaft passing through a casing of said apparatus is provided with a seal for preventing the passage of refrigerant outwardly from, or of air inwardly into, said apparatus along said shaft.

Another object of this invention is to provide means in said seal for preventing audible vibrations in said seal.

Another object of this invention is to provide means for insuring lubrication of said seal at all times.

Another object of this invention is to provide means for insuring lubrication of said seal and its adjacent bearing at all times.

Another object of this invention is to provide means for preventing travel of oil along said shaft to the driving means, and thus to prevent deterioration of said driving means.

Another object of this invention is to prevent the evaporation of refrigerant mixed with the lubricant in a lubricating reservoir from flowing a detrimental amount of lubricant away from the reservoir or bearing served thereby.

Further objects and advantages of the present invention will be apparent from the following description, reference being had to the accompanying drawings wherein a preferred form of embodiment of the present invention is clearly shown.

In the drawings:

Fig. 1 is a view partly in section, partly in elevation and partly diagrammatic of a refrigerating apparatus embodying features of my invention;

Fig. 2 is an enlarged detailed cross-sectional view of a portion of said apparatus;

Fig. 3 is a plan view of the crankcasing of the compressor shown in Fig. 1;

Figs. 4, 5 and 6 are elevations of the various portions of the end structure of the seal;

Fig. 7 is a side elevation of a portion of a squeak damping means;

Fig. 8 is an end view of Fig. 7;

Fig. 9 is an end view of a portion of an oil intercepting means; and

Fig. 10 is a side elevation of Fig. 9.

A refrigerating apparatus, which may be of the type generally known as a household refrigerating apparatus and which embodies features of my invention, is generally designated as 20. This type of apparatus is generally installed in places where there is no skilled attendant. Apparatus of this type must be automatic in its operation, and any parts which need practically constant adjustment must be of an automatically adjusted type. This type of apparatus necessarily must operate without any constant care from a skilled attendant. Apparatus of this type may comprise a compressor 21 discharging through an outlet 22 into a pipe 23 which delivers the compressed refrigerant to a condenser 24. A receiver 25 receives the liquefied refrigerant from the condenser 24 and delivers the same to an evaporator 26. This evaporator may have a float controlled valve, not shown, controlling the entrance of liquid refrigerant from the pipe 27 connecting the received 25 with the evaporator. Evaporated refrigerant leaves the evaporator 26 through a pipe 28 which returns the refrigerant to the compressor 21, preferably in the crankcase 29, through the crankcase inlet 29a. A means for automatically controlling the operation of the compressor is provided. In this particular embodiment, an expansible bellows 30 is connected by the pipe 31 with the pipe 28. The expansible bellows 30 operates the snap switch 32 which controls the starting and stopping of an electric motor, not shown, which drives the compressor 21. A refrigerant which may be used in this apparatus is $SO_2$.

The compressor 21 is drivingly connected through the shaft 40 with the motor hereinbefore described preferably by a large wheel 40a at the end of shaft 40 driven by a belt connected to a pulley on the motor. The shaft 40 reciprocates pistons 41, preferably through pitmen 42 surrounding eccentrics keyed to the shaft 40. The shaft 40 must pass through a wall of the refrigerating apparatus, which wall is generally designated as 44. The shaft 40 may be supported in bearings 45 and 46.

A seal is provided between the shaft 40 and the wall 44. In this particular embodiment a flexible wall 47 is interposed between the shaft 40 and the refrigerating apparatus wall 44, which flexible wall may be of a type permitting some relative axial movement between its connections. A frictional hermetic sliding connection is provided for the wall 47. Preferably, though not necessarily, this sliding connection is provided between the wall 47 and the shaft 40. This sliding connection may include a ring 48 of relatively self-lubricating material hereinafter more fully described. The ring 48 may be hermetically connected with the wall 47 by any suitable means. For instance, a bronze ring 49 may be connected with the wall 47 by brazing or soldering or any other suitable means and the rings 48 and 49 may be joined by any suitable means such as by a litharge cement joint 48b. As will be hereinafter more apparent, the ring 49, in combination with other elements, performs also the function of damping audible vibrations in the seal. The other edge of the wall 47 may have a hermetic joint with the wall 44 of the refrigerating apparatus. In this particular embodiment, the edge of the wall 47 may be hermetically connected with a gasket-like ring 50 interposed between the shoulder 51 of the wall 44 and an end plate 52. The shoulder 51 and the end plate 52 may be clamped together by any suitable means such as bolts 53. The flexible wall 47 may, when relatively great axial flexibility is desired, be of the corrugated metallic bellows type.

The ring 48 is kept in frictional contact with a shoulder 54 of the shaft 40 to provide a sliding hermetic connection which, in this particular embodiment, is between the wall 47 and the shaft 40. The shoulder 54 may be integral with, or may be hermetically connected to, the shaft 40. In order to maintain the frictional contact, a spring 55 may be interposed between an abutment and the ring 49. For instance, the spring may abut against a secondary end plate 52a also held by the bolts 53. The shaft 40 may be prevented from moving axially to the right by providing a shoulder 56 which abuts against the sleeve of eccentrics 43 which in turn abuts against the bearing 46 or against the interposed washers 46a. As shown, lubricating passage 57 may be provided in the bearing 46.

The hermetic frictional sliding engagement of the seal, which in this particular embodiment occurs between the ring 48 and the shoulder 54, tends to set up audible vibrations in the seal. Merely as a theory, the truth of which is unnecessary to a full disclosure, it is suggested that these vibrations may be of a tortional character, or they may be due to a slight axial movement of the ring 48 away from the shoulder 54 or a combination of both caused possibly by irregular slippage in the sliding hermetic joint between ring 48 and shoulder 54. Whatever the cause of these vibrations is, the vibrations are of a very disagreeable nature in a refrigerating apparatus of this type. Means for damping these vibrations into the inaudible range may be provided. In general, these means may comprise devices for preventing the formation of the audible vibrations, and also means for checking the vibrations should they tend to be formed. A means for positively lubricating the frictional sliding engagement is provided as hereinafter more fully to be described, which tends to remove the cause of vibrations. Means are also provided for checking these vibrations should they tend to be formed.

The means for checking the vibrations, should there be a tendency to form them, may comprise a damping member made of solid material which may be applied to the seal at a place where the vibrations tend to have a large amplitude. The damping member as herein contemplated is a solid member, and by the word "solid" I mean a member which is of a non-plastic nature and therefore need not be hermetically arrested in its place. It may be yielding or even porous in its nature, however. The member preferably is applied at a portion of the seal where audible vibrations tend to be violent. In this particular embodiment, the end of the seal which is connected to the wall 44 by the gasket-like member 50 probably never has any extensive vibrations. The end which is in contact with the shaft 40, however, probably has the most violent vibrations. It is thus seen a seal of this character is liable to have a point where audible vibrations are violent and preferably a damping member is applied adjacent such a point; that is, a damping member may be adjacent an antinode of the vibrations.

In this particular embodiment, the solid damping member may comprise a sleeve 60 which is interposed between the spring 55 and the shaft 40. The sleeve 60 may be provided with flanges 61 which are adapted to be clamped between the end of the spring 55 and the ring 49, though in this particular embodiment, washers 62 may be provided between the spring 55 and the ring 49. The sleeve 60 performs the double function of tending to damp the vibrations which occur near the sliding frictional surfaces and also prevents the spring 55 from touching the shaft 40. The spring 55, if it should touch the shaft 40 would tend to impart vibrations, probably of a tortional character, to the seal within the audible range. Since the rings 48 and 49 are practically a unitary structure regarding vibrations, the damping member 60 is practically applied at the frictional surface between ring 48 and shoulder 54. The member 60 connects the vibrating portions of the seal with other portions of the apparatus so that the resultant period of vibration, if any, is outside of the audible range.

The end of the shaft 40 which is adjacent the bearing 46 may be hermetically sealed by a threaded nut 65. This seal is of the non-frictional type, so that this seal does not tend to set up audible vibrations, and therefore no vibration damping means is necessary for this seal.

In order to secure improved lubrication and in order to prevent the tendency of the formation of audible vibrations, I have provided means for positively lubricating the sliding engagement of the seal and also of the bearing 45 adjacent the seal. For this purpose the lubricant supply is of such a character that the sliding connection is always at least partially submerged in lubricant and the reservoir in which the lubricant is held for submerging the sliding connection is so constructed that any refrigerant mixed with the lubricant may boil in said reservoir without depleting the lubricant supply to a detrimental extent. As a specific embodiment of such a reservoir, I provide an oil pocket 70 surrounding the sliding connection and also a portion of the remainder of the seal and this pocket is connected by one or more passages 71 to an oil trough 72 placed in the crankcasing 29 of the compressor. This trough 72 is adapted to receive splash from the moving parts in the crankcasing and to fill the oil pocket 70 with lubricant. Thus, in this particular embodiment, the boiling lubricant reservoir features of my invention are applied to the seal.

Under normal operation of the refrigerating apparatus, the level of lubricant in the crankcasing varies to a substantial degree. At times the level may drop below the lowermost position of the pitmen 42 and when such is the case there is practically no lubrication by the splash method during such a period.

When a refrigerating apparatus is provided with a refrigerant which may become mixed with lubricant it is sometimes very difficult to maintain a good lubrication for all of the parts of the apparatus. Since the refrigerant and the lubricant may become mixed either by dissolving in each other or by forming an emulsion, reservoirs provided for lubricant are liable to become emptied of lubricant should the admixed refrigerant suddenly become volatilized. This is liable to occur frequently because of changes in temperatures during the operation of the refrigerating system. In the reservoir which I have provided, the refrigerant may boil away in the oil pocket 70 either gradually or suddenly. Should the boiling occur suddenly the discharge of gases generally will follow one only of the passages 71. This occurs because of some inevitable inequality in the two passages. The passage through which the gases do not discharge and the trough 72 contain enough lubricant so that after a sudden discharge through one of the passages 71 lubricant may flow back into the oil pocket 70 and at least partially submerge the sliding contact of the seal. This constant supply of lubricant also insures a good lubrication of the portion of the shaft in bearing 45.

Under some conditions the lubricant in the crankcase 29 while it may be below the level of the lowermost position of the pitmen 42 may become of a frothy nature with bubbles of entrapped vaporized refrigerant. Any small passage leading to the seal would not supply lubricant to the seal since the froth would not flow into such a passage; but applicant's large trough 72 and the relatively large passages 71 insure a supply of lubricant under such frothy conditions.

In a seal of the general character herein disclosed whether positively lubricated or only intermittently lubricated, a certain amount of lubricant tends to pass the seal and to travel along the shaft. Such oil, in the construction shown, ordinarily would travel out along the shaft 40 on to the wheel 40a. The oil would then eventually find its way to the belt running on the wheel 40a and would impair its life. I have provided means for preventing such travel of oil. A way of preventing the travel may comprise an oil-throwing ring 80 surrounded by the oil catching disc 81. The oil catching disc 81 may be part of the end plate assembly and may be held by the bolts 53. The secondary end plate 52a hereinbefore described may be provided with a passage 52b so that the oil thrown by the ring 80 may be caught in the cavity 83 and may flow along the passage 52b down to an axially directed trough 84 formed by a horizontally bent tongue on the disc 81. The end plate 52 may also be provided with a recess 85 in order to insure the flow of lubricant along the tongue 84. The tongue 84 is extended axially beyond the wheel 40a so that any oil dripping from the end 86 of the tongue 84 does not fall on the wheel 40a. Thus the wheel 40a is kept free of any lubricant and destruction of the belt by such lubricant is prevented.

In assembling the seal, the wall 47 together with the rings 48 and 49 and the gasket-like member 50 may be inserted first. The sleeve 60 may be assembled on the spring 55 and may then be inserted over the end of the shaft together with the washers 62. Thereafter the end plate structure including the plates 52, 52a and 81 may be secured by means of the bolts 53. The oil-throwing ring 80 may be driven on the shaft.

Merely as examples, the ring 48 may be of the substance called Durex as hereinbefore described, and it may be manufactured somewhat after the procedure described in the patents to Williams et al, 1,642,347; 1,642,348 and 1,642,349 patented September 13, 1927. However, I prefer to use a ring of the following constituents manufactured according somewhat after the processes described in the above patents, namely:

|  | Per cent |
|---|---|
| Copper | 70 |
| Lead | 20 |
| Tin | 5 |
| Phosphor tin | 2 |
| Atchison graphite | 5 |

However, the proportions may be varied somewhat and I have found the following proportions also to give good results:

|  | Per cent |
|---|---|
| Copper | 60 |
| Lead | 35 |
| Phosphor tin | 2 |
| Atchison graphite | 5 |

I have also found that a ring having an external diameter of 1 inch and an internal diameter of ¾ inch has been found satisfactory in a medium sized household refrigerating apparatus and in this size the spring 55 may exert normally a pressure of about 70 pounds on the ring 48.

The type of seal hereinbefore described is self-adjusting by its resiliency but because of the vibration checking means and because of the positive lubrication provided for the sliding surfaces, squeaks are not set up therein.

While the form of embodiment of the invention as herein disclosed, constitutes a preferred form, it is to be understood that other forms might be adopted, all coming within the scope of the claims which follow.

What is claimed is as follows:

1. A seal for a compressor having an apertured wall, a shaft passing through the aperture in the wall, a seal for said shaft having hermetic connections with said shaft and wall, one of said connections being a sliding connection, wherein there are relatively moving sealing faces, a spring surrounding said shaft urging said sealing faces together, and a single sleeve interposed between said shaft and spring, in contact with the inner surface of said spring and extending throughout the length of said spring.

2. A seal for a compressor having an apertured wall, a rotary shaft projecting through the aperture in the wall, a seal between said shaft and said wall having hermetic connections with said shaft and wall, a stationary spring closing said seal and surrounding said shaft, and means for dampening vibrations in the spring comprising a sleeve in contact with the spring substantially throughout its length.

3. A seal for a compressor having an apertured wall, a rotary shaft projecting through the aperture in the wall, a seal between said shaft and said wall, said seal having hermetic connections with said shaft and wall, a stationary spring closing said seal and surrounding said shaft, and means for dampening vibrations in the spring, said last named means comprising a radially expansible sleeve interposed between the shaft and said spring and contacting said spring.

In testimony whereof I hereto affix my signature.

OTTO M. SUMMERS.